United States Patent
Homier et al.

[15] 3,692,271
[45] Sept. 19, 1972

[54] ADJUSTABLE SEAT ASSEMBLY

[72] Inventors: Robert I. Homier, Farmington; Raymond C. Posh, Livonia, both of Mich.

[73] Assignee: Lear Siegler, Incorporated, Detroit, Mich.

[22] Filed: Feb. 24, 1971

[21] Appl. No.: 118,512

Related U.S. Application Data

[63] Continuation of Ser. No. 795,562, Jan. 31, 1969, abandoned.

[52] U.S. Cl. ................. 248/394, 248/396, 248/421, 248/423
[51] Int. Cl. ...... F16m 11/24, F16m 13/00, B60n 1/02
[58] Field of Search ...... 248/394, 396, 421, 423, 422, 248/420, 419, 398, 397, 395, 393

[56] References Cited

UNITED STATES PATENTS

| | | | |
|---|---|---|---|
| 2,227,764 | 1/1941 | Saunders et al. | 248/421 |
| 2,609,029 | 9/1952 | Haberstump | 248/394 |
| 2,795,267 | 6/1957 | Williams | 248/394 |
| 3,049,330 | 8/1962 | Cooms et al. | 248/421 |
| 3,147,945 | 9/1964 | Leslie et al. | 248/394 |
| 3,460,793 | 8/1969 | Posh | 248/394 |
| 3,165,351 | 1/1965 | Clancy et al. | 248/429 |

*Primary Examiner*—Marion Parsons, Jr.
*Attorney*—McGlynn, Reising, Milton & Ethington

[57] ABSTRACT

An adjustable seat assembly including a base, a seat support, and means for independently adjusting the vertical elevation of the front and rear portions of the seat support relative to the base including on each side of the assembly a pair of lever arms each being pivotally connected to the base and independently pivotally connected to the seat support. The pivotal connection of each of the levers to the seat support is disposed inwardly and between the pivotal connections of the levers to the base. The inward end of each of the levers has formed thereon a plurality of notches. Latch plates pivotally mounted on the seat support include tapered teeth engageable with any of the notches in the associated lever arms to latch the lever arms in desired angular dispositions corresponding to desired elevations. A pivotal control link is operable by way of an actuator arm to selectively disengage the latch plates from the associated lever arms. The lever arms and control links on opposite sides of the seat assembly are interconnected for synchronous operation. The base is longitudinally slidable to provide fore-and-aft adjustment.

12 Claims, 5 Drawing Figures

INVENTORS
Robert I. Homier, &
BY Raymond C. Posh

Barnard, McGlynn & Reising
ATTORNEYS

INVENTORS
Robert I. Homier &
Raymond C. Posh
BY Bernard, McGlynn & Reising
ATTORNEYS

ADJUSTABLE SEAT ASSEMBLY

This application is a Streamlined Continuation of U.S. Ser. No. 795,562, filed Jan. 31, 1969 now abandoned.

INTRODUCTION

This invention relates to seat assemblies and more particularly to a seat assembly in which the front and rear of a seat support are independently adjustable in elevation relative to a base.

The prior art discloses manually adjustable seat assemblies in which the front and rear of a seat support member are independently adjustable in elevation relative to a base. U.S. Ser. No. 623,261, filed Mar. 15, 1967, now Pat. No. 3,460,793, in the name of Raymond C. Posh, discloses such a system in which a base and a seat support member are interconnected by at least one pair of lever arms which are pivotally connected to both the base and the seat support member at longitudinally spaced points such that the angular disposition of each lever arm adjusts the elevation between either the front or rear portion of the seat support relative to the base. The lever arms are latchable in desired angular dispositions by means of a latch assembly including a pair of substantially horizontal latch plates which are pivotable about a substantially vertical axis to selectively engage notches in the inward ends of the lever arms. A control arm is interconnected with the latch plates to permit the latch plates to be selectively disengaged from the associated lever arms.

The horizontal orientation of the latch plates in the prior art assembly described above produces a relatively high friction force between the lever arm notches and the associated latch plates which gives rise to resistance to an unlatching action when the seat is under load. Moreover, a close mechanical tolerance between the latch plates and the notches in the lever arms is required to ensure that the latch plate thickness does not significantly vary over the portion thereof which travels in the lever arm slot and further that the latch plate portion which engages the slot is flat and smooth so that rotation of the latch plate does not produce a "wobble" in the lever arm. Such "wobble" would, of course, produce a vertical displacement of the loaded seat and greatly increase the resistance to the unlatching operation.

In accordance with the present invention the difficulties associated with the prior art system are avoided by means of a latch mechanism which is simple in fabrication, assembly, and operation and which produces a minimum of frictional resistance when being disengaged. In general, this is accomplished by providing an adjustable seat mechanism having at least one pair of lever arms which are pivotally interconnected between a base and a seat support and which extend inwardly toward one another, together with a pair of latch plates which are pivotally connected to the seat support for rotation about axes transverse of the base and selectively engageable with the inwardly extending ends of the lever arms to prevent rotation thereof when engaged, and a control link which is pivotally connected to the seat support and connected through lost motion connections to the latch plates such that rotation of the control link about the transverse axis causes one or the other of the latch plates to pivot about the transverse axis to effect a substantially immediate disengagement of one of the latch plates from the associated lever arm.

In a preferred form of the invention, the lever arms are provided with tapered notches and the latch plates are provided with teeth which fit into the notches such that rotation of a latch plate withdraws the tooth from the tapered slot.

In a specific embodiment of the invention, seat adjuster apparatus of the type described above is provided at each side of a seat assembly having a base which includes at least one track for permitting fore-and-aft adjustment of the entire assembly. Accordingly, a seat assembly having six modes of adjustment is provided in such a fashion as to permit simple and expeditious manual operation.

Further features and advantages of the invention will be apparent upon reading the following specification which is to be taken with the accompanying drawings of which:

Figure 1:
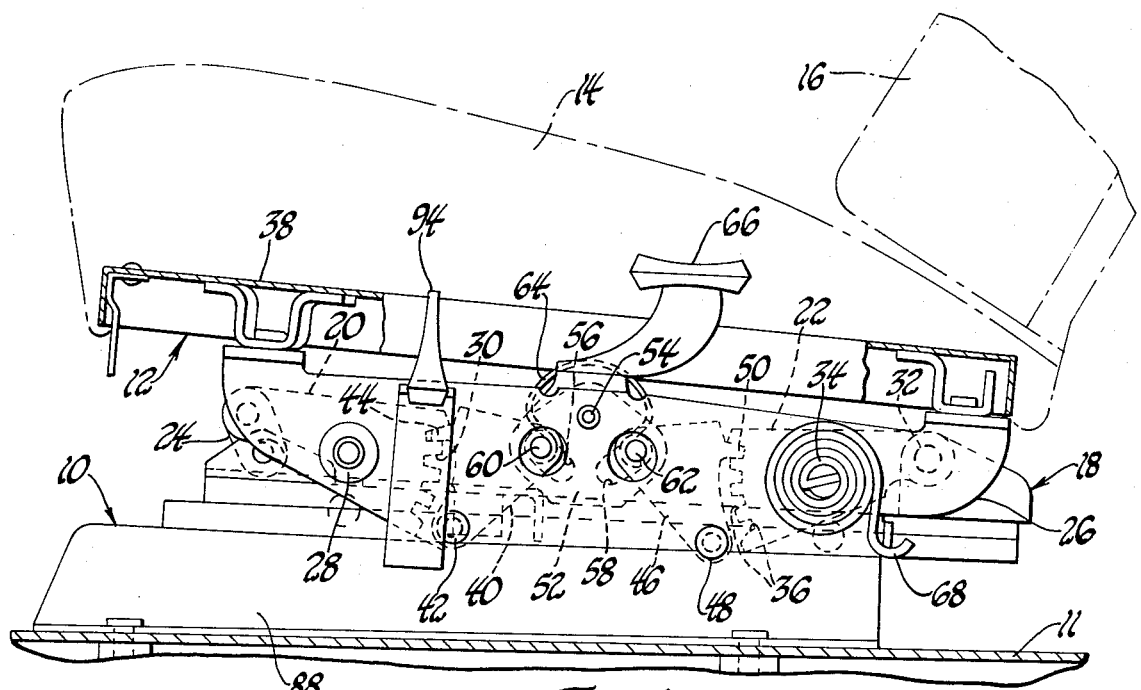
FIG. 1 is a side view of an illustrative embodiment of the invention in a fully lowered position.

Referring to FIGS. 1 through 4 of the drawing, the illustrative adjustable seat assembly comprises a base 10 which is adapted to be mounted on the floor 11 of a vehicle, for example, and a seat support 12 carrying a seat 14 having a backrest portion 16. The elevation between the front and rear portions of the seat support 12 and the base 10 is adjustable by means of adjuster mechanism 18 which is disposed between the base 10 and the seat support 12.

Adjuster mechanism 18 comprises a pair of sectorially shaped lever arms 20 and 22. Lever arm 20 has the narrow outer end thereof pivotally connected to the base 10 by a short pivot link 24 to permit angular displacement of the lever arm 20 relative to the base 10 about an axis transverse of base 10. Lever arm 20 is independently pivotally connected at 28 to a bracket 26 which is connected to and depends from the seat support 12. The arcuate inwardly facing end of lever arm 20 has formed therein a plurality of inwardly tapered notches 30 which permit the lever arm 20 to be latched in any one of a plurality of angular dispositions relative to base 10.

Similarly, lever arm 22 is pivotally connected to the base 10 by pivot 32 and independently pivotally connected to the depending bracket 26 by means of pivot 34. Lever arm 22 has formed in the arcuate inwardly facing end thereof a plurality of inwardly tapered notches 36 which correspond to the notches 30 in lever arm 20. The depending bracket 26 is suitably bolted or riveted to a bed 38 which forms part of seat support 12 by means of a plurality of out-turned tabs 39 best shown in FIG. 4. The pivotal connections between the lever arms 20 and 22 and the bracket 26 are longitudinally spaced apart. Accordingly, lever arm 20 controls the elevation of the front of seat support 12 and lever arm 22 controls the rear elevation.

To latch lever arm 20 in a desired angular disposition a latch plate 40 is connected by pivot 42 to the depending bracket 26 for angular rotation about an axis which is transverse to the base 10. Latch plate 40 has formed thereon a tapered tooth 44 which is adapted to engage any one of the plurality of notches in lever arm 20. A similar latch plate 46 is pivotally connected to the bracket 26 by pivot 48 to permit angular rotation about a horizontally transverse axis. Latch plate 46 carries a tapered tooth 50 which is adapted to engage any one of the slots 36 in lever arm 22 to prevent rotation of the lever arm 22 when engaged. The taper of notches 30, 36 and teeth 44, 50 may be on the order of five degrees to permit the teeth to be easily withdrawn from any one of the notches when disengagement between the lever arms and the latch plates is desired.

Engagement between the latch plates 40, 46 and the corresponding lever arms 20, 22, respectively, is controlled by means of a flat control link 52 which is pivotally connected at 54 to bracket 26 for rotation about a transverse axis. Control link 52 has formed therein a pair of elongated slots 56 and 58 the major dimensions of which are perpendicular to radii drawn between the pivot 54 and the slots. Pins 60 and 62 carried by latch plates 40 and 46, respectively, ride within the slots 56 and 58, respectively, to form a lost motion connection between the control link 52 and each of the latch plates 40 and 46. Accordingly, rotation of control link 52 in one direction about pivot 54 tends to disengage one of the latch plates from its associated lever arm but permits the other latch plate to remain in engagement with its associated lever arm. An arcuate spring 64 having terminal ends in engagement with the pins 60 and 62 is inwardly compressed so as to urge the latch plates 40 and 46 outwardly away from one another and into engagement with the associated lever arms 20 and 22, respectively. The pivotal motion of control link 52 is determined by operator control of an actuator arm 66 which extends outwardly and upwardly from the adjuster mechanism 18 to provide access thereto by an occupant of the seat 14. An energy storing mechanism in the form of a flat wound spring 68 is connected between base 10 and lever arm 22 to assist in raising the rear of seat support 12. Spring 68 is torsionally compressed to bias lever arm 22 upwardly to the FIG. 2 position but is yieldable to permit other angular dispositions as shown in FIG. 1.

Figure 2:
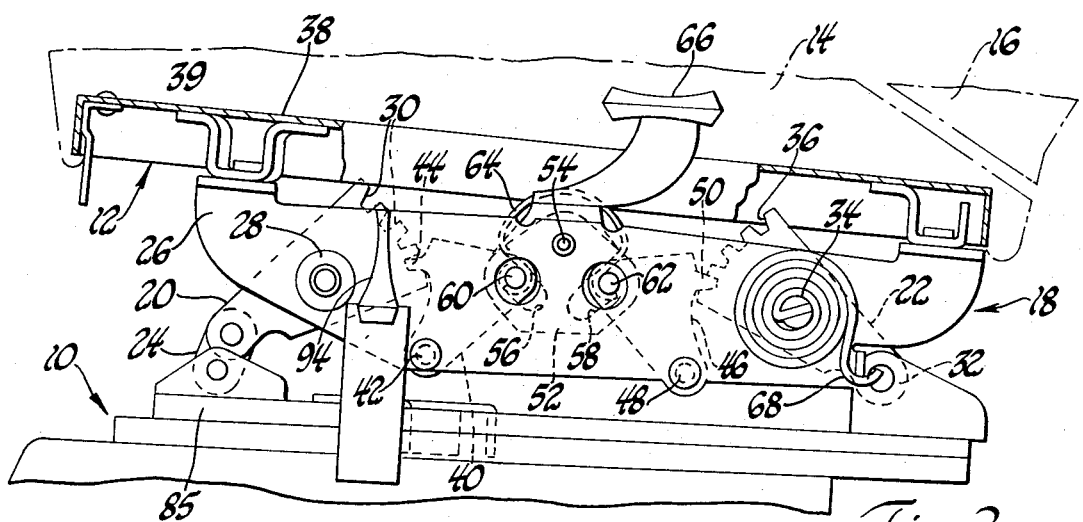
FIG. 2 is a side view of the FIG. 1 apparatus in a fully raised position.
Figure 3:
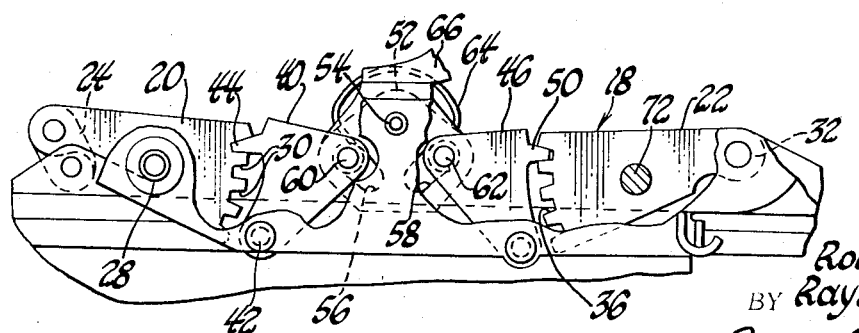
FIG. 3 is a side view with parts broken away of the FIG. 1 apparatus.

Describing the operation of the apparatus shown in FIGS. 1 through 3, the adjuster mechanism 18 permits independent adjustment of the front and rear elevations of seat support 12 relative to base 10. The seat support 12 is adjustable between the fully lowered or minimum elevation position shown in FIG. 1 and the fully raised or maximum elevation position shown in FIG. 2. To accomplish this adjustment, actuator arm 66 may be rotated counterclockwise, for example, causing control link 52 to rotate correspondingly about pivot 54 thereby disengaging latch plate 40 from lever arm 20 by withdrawing the tooth 40 from the uppermost slot 30 in the lever arm 20. Lever arm 20 is thus free to pivot about pivot link 24 thus permitting the front of the seat support 12 to be raised. The occupant of the seat may assist in this operation simply by leaning back on the backrest portion 16. After the seat support 12 is placed in the desired elevation relative to base 10, the actuator arm 66 is released and arcuate spring 64 urges the latch plate 40 outwardly into engagement with the newly selected notch 30 in lever arm 20 as shown in FIG. 2. The mechanism 18 is again latched. Counterclockwise rotation of actuator arm 66 does not affect the engagement between latch plate 46 and lever arm 22 because of the lost motion connection including elongated slot 58 and pin 62. A clockwise rotation of actuator arm 66 performs a corresponding function to permit the rear of seat support 12 to be raised or lowered as desired with the assistance of spring 68.

Figure 4:
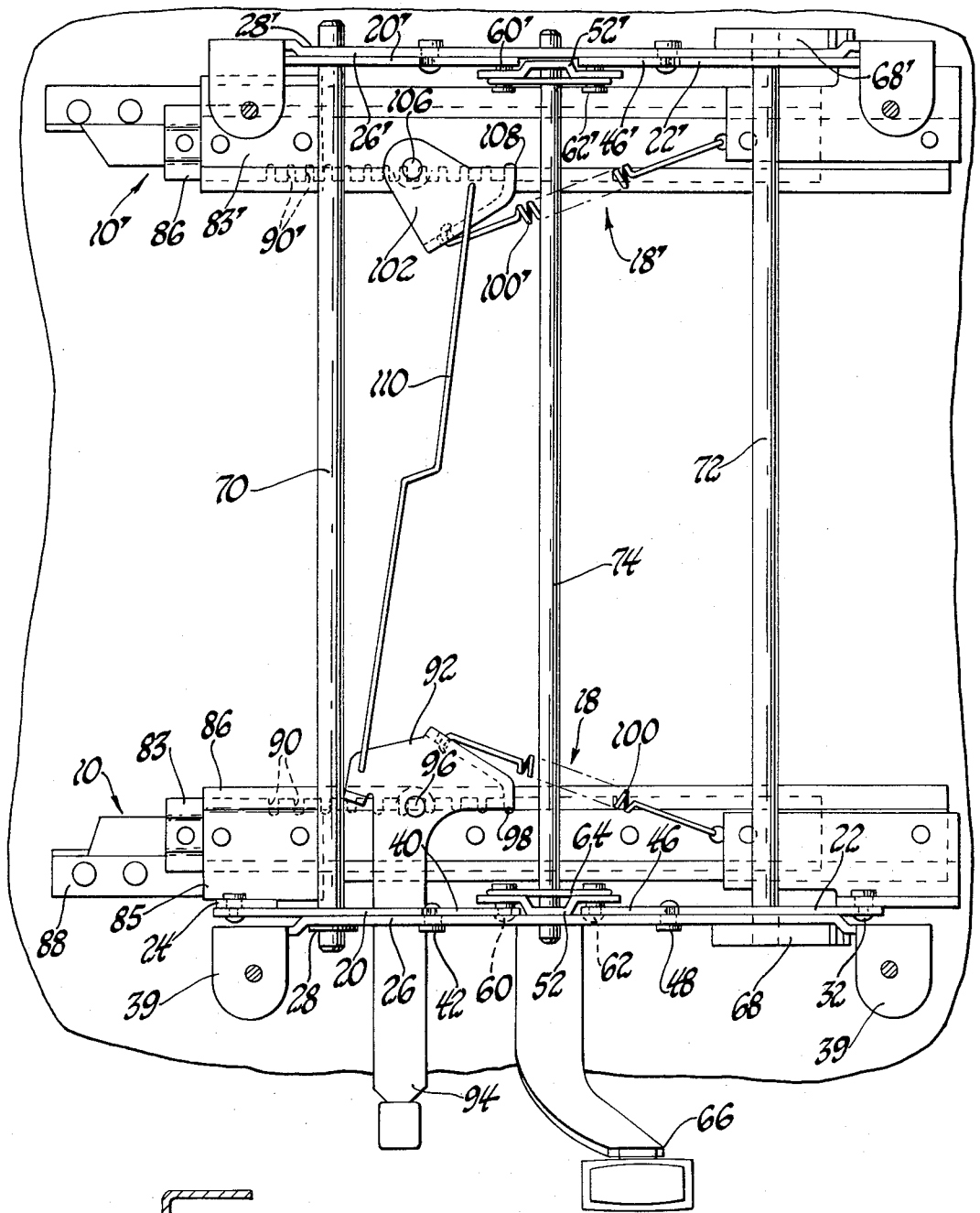
FIG. 4 is a plan view of the illustrative embodiment.

As shown in FIG. 4, substantially identical adjuster mechanisms 18 and 18' are disposed on laterally opposite sides of seat support 12. Adjuster mechanism 18' includes a second pair of lever arms 20' and 22' having the outer ends pivotally connected to a base 10' and arcuate inner ends latchably engageable with latch plates 40' and 46', respectively, pivotally connected to a bracket 26'. The latch plates 40' and 46' are pivoted by a control link 52' which is pivotally connected to bracket 26' which is attached to the bed 38 in the manner shown in FIGS. 1 through 3. Control link 52' is connected to the latch plates 40' and 46' by lost motion connections including elongated slots and pins 60' and 62'. To synchronize the operation of the adjuster mechanisms 18 and 18' the lever arms 20 and 20' are interconnected by means of a rod-like torque member 70 which extends transversely through the brackets 26 and 26' as shown in FIG. 4. Torque member 70 may be welded or otherwise suitably secured to either the brackets 26 and 26' or the lever arms 20 and 22' to permit the pivotal connections 28 and 28' previously described. Similarly, lever arms 22 and 22' are interconnected by means of a rod-like torque member 72. The control links 52 and 52' are also synchronized in operation by means of an interconnecting torque member 74 which is suitably secured to each of the links 52 and 52'. Accordingly, rotation of actuator arm 66 to pivot control link 52 also correspondingly pivots control link 52' to disengage corresponding latch plates and lever arms on both sides of the apparatus shown in FIG. 4. Upward rotation of lever arm 22' is assisted by a spring 68' in the same manner described with reference to lever arm 22.

Figure 5:
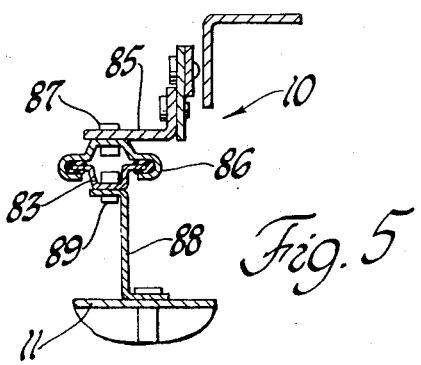
FIG. 5 is a detailed cross-sectional view of a suitable longitudinally adjustable base mechanism useable with the FIG. 1 apparatus.

Referring to FIGS. 4 and 5, the bases 10 and 10' may be provided with track means to permit longitudinal adjustment of the seat support 12 relative to the floor 11 of the vehicle on which it is mounted. Base 10, which is representative, includes a support bracket 85 which is disposed laterally inwardly of bracket 26 and which carries the pivotal ends of the lever arms 20 and 22. Bracket 85 is secured by rivets 87 to a longitudinally extending upper track member 86 which is slidably disposed over a longitudinally extending lower track member 83. The lower track member 83 is riveted at 89 to an upstanding support bracket 88 which, in turn, is adapted to be mounted to the vehicle floor 11. A suitable low-friction bearing material is placed between track members 83 and 86 to facilitate longitudinal sliding therebetween.

To lock the upper and lower track members 86 and 83, respectively, the lower track member 83 is provided with a series of longitudinally spaced notches 90 adapted to receive a depending dog 98 on a latch plate 92 which is pivotally connected to upper track member 86 at 96. Latch plate 92 is formed integrally with a transversely extending arm portion 94 which can be grasped by the occupant of the seat 14. A spring 100 is tensioned between the support bracket 85 and the latch plate 92 to urge dog 98 into engagement with one of the notches 90.

Similarly, base 10' includes a lower track member 83' having a plurality of longitudinally spaced notches 90' formed therein. A latch plate 102 pivotally connected to an upper track member 86' at 106 carried a depending dog 108 adapted to engage any one of the plurality of slots 90'. A spring 100' urges the dog 80 into engagement with the notches 90'. To synchronously disengage the latch plates 92 and 102 a rod 110 is connected between the latch plates such that pivotal motion of latch plate 92 in response to operation of the actuator arm 94 causes corresponding pivotal motion of latch plate 102 synchronously disengaging the latch plates from the associated track members 83 and 83'.

In summary, the invention has been described with reference to an automotive vehicle seat assembly in which the front and rear portions of a seat support may be independently adjusted in elevation relative to a seat base by selective operation of a single actuator arm which serves to latch and unlatch the mechanisms which support the seat relative to a base. Moreover, the seat assembly is longitudinally adjustable by means of tracks which are mounted on a vehicle floor. It is to be understood that the foregoing description is illustrative in nature and is not to be construed in a limiting sense.

While a specific form of the invention is illustrated and described in the foregoing specification and accompanying drawings, it should be understood that the invention is not limited to the exact construction shown but that various alternatives in the construction and arrangement of parts, all falling within the scope and spirit of the invention, will be apparent to those skilled in the art.

The embodiments of the invention in which an exclusive property or privilege is claimed are defined as follows:

1. An adjustable seat assembly comprising: a base, a seat support, first and second sector-shaped lever arms each being pivotally connected at one end to the base for rotation about an axis transverse of the base, the other ends of the lever arms extending inwardly toward one another, transverse rod means pivotally connecting each of the first and second lever arms at points mediate the ends thereof to the seat support at longitudinally spaced points along the seat support for independently adjusting the elevation between said spaced points and the base by rotation of the lever arms, first and second latch plates pivotally connected to the seat support for rotation about respective transverse axes and selectively engageable with the other ends of the first and second lever arms respectively to prevent rotation thereof when engaged, a single control link pivotally connected to the seat support and having lost motion connections to the first and second latch plates, and an actuator for pivoting the control link to selectively disengage both of the latch plates from the lever arms, the other ends of the lever arms each having formed therein and a plurality of notches and the latch plates each having formed thereon a tooth which is selectively engageable with any of the plurality of notches in the associated lever arm whereby each of the first and second lever arms may be latched in a plurality of angular dispositions, the notches and the tooth of each lever arm and latch plate combination being correspondingly tapered.

2. An adjustable seat assembly as defined in claim 1 including spring means biasing the latch plates into engagement with the lever arms.

3. An adjustable seat assembly comprising: a base, a seat support, first and second sector-shaped lever arms each being pivotally connected at one end to the base for rotation about an axis transverse of the base, the other ends of the lever arms extending inwardly toward one another, transverse rod means pivotally connecting each of the first and second lever arms at points mediate the ends thereof to the seat support at longitudinally spaced points along the seat support for independently adjusting the elevation between said spaced points and the base by rotation of the lever arms, first and second latch plates pivotally connected to the seat support for rotation about respective transverse axes and selectively engageable with the other ends of the first and second lever arms respectively to prevent rotation thereof when engaged, a single control link pivotally connected to the seat support and having lost motion connections to the first and second latch plates, and an actuator for pivoting the control link to selectively disengage both of the latch plates from the lever arms, the other ends of the lever arms each having formed therein a plurality of notches and the latch plates each having formed therein tooth means selectively engageable with any of the plurality of notches in the associated lever arm whereby each of the first and second lever arms may be latched in a plurality of angular dispositions, the control link being a flat plate having two elongated slots, and the lost motion connections including pins connected to the latch plates and riding in the slots whereby limited pivotal motion of the control link disengages only one of the latch plates from the associated lever arm.

4. An adjustable seat assembly as defined in claim 3 including an arcuate spring having terminal ends engaging the pins and being inwardly flexed to bias the latch plates outwardly into engagement with the lever arms.

5. An adjustable seat assembly as defined in claim 3 including energy storing means operatively connected to one of the lever arms to bias the lever arm toward an angular disposition wherein the elevation between one of the spaced points of the seat support and the base is maximum but yieldable to permit other angular dispositions.

6. An adjustable seat assembly as defined in claim 3 wherein the lever arms are disposed adjacent one side of the base, the assembly further including third and fourth lever arms disposed adjacent the other side of the base in laterally corresponding relationship to the first and second lever arms each of the third and fourth lever arms being pivotally connected at one end to the base for rotation about the transverse axes the other ends of the lever arms extending inwardly toward one another, means pivotally connecting each of the third and fourth lever arms to the seat support at longitudinally spaced points along the seat support for independently adjusting the elevation between said spaced points and the base by rotation of the lever arms, and torque members connecting the first and second lever arms to the third and fourth lever arms respectively for synchronizing rotation thereof.

7. An adjustable seat assembly as defined in claim 6 including third and fourth latch plates pivotally connected to the seat support for rotation about respective transverse axes and selectively engageable with the other ends of the third and fourth lever arms, respectively, to prevent rotation thereof when engaged, a second control link pivotally connected to the seat support and having lost motion connections to the third and fourth latch plates, and a torque member connecting the control links to synchronize pivotal motion thereof.

8. An adjustable seat assembly as defined in claim 7 including wound spring means operatively connected to each of the third and fourth lever arms and biasing said third and fourth lever arms to an angular position wherein the elevation between the spaced points associated with said third and fourth lever arms and the base is a maximum.

9. An adjustable seat assembly as defined in claim 3 wherein the base includes track means for adjusting the longitudinal position of the seat support relative thereto.

10. An adjustable seat assembly as defined in claim 6 wherein the base includes track means for adjusting the longitudinal position of the seat support relative thereto.

11. An adjustable seat assembly comprising: a base, a seat support, first means pivotally connecting the front of the seat support to the base, second means adjustably pivotally connecting the rear of the seat support to the base and including a pair of sector-shaped lever arms connected in parallel relationship and spaced laterally from one another beneath the rear of the seat support and having forward and rearward ends, the rearward end of each lever arm being pivotally connected to the base and an intermediate point of each arm being connected to the seat support whereby pivoting the lever arms adjusts the seat support vertically relative to the base, the forward ends of the lever arms being of relatively large vertical dimension and having vertically spaced notches therein, latch dogs pivotally disposed on laterally opposite sides of the seat support and each having a single tooth which by pivotal displacement of the latch dogs about an axis transverse of the seat is engageable with any of the several lever arm notches, control links on the seat support for selectively pivoting the latch dogs under manual control, means for synchronizing the displacement of the control links, means for synchronizing the pivotal displacement of the lever arms, and means for resiliently biasing the seat support to a position of maximum vertical displacement relative to the base.

12. An adjustable seat assembly as defined in claim 11 wherein the latch dog teeth and lever arm notches are correspondingly tapered.

* * * * *